(No Model.) 2 Sheets—Sheet 1.
R. H. WIGGINS.
PLOW.
No. 599,210. Patented Feb. 15, 1898.
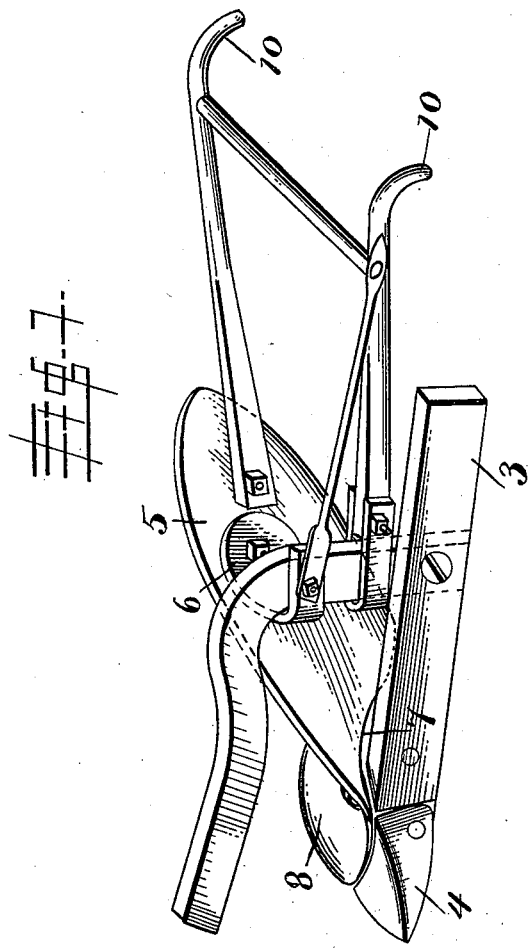
R. H. Wiggins
Inventor
Witnesses
W. C. Bowen
J. Albertson
By H. B. Willson
Attorney
THE NORRIS PETERS CO., PHOTO-LITHO., WASHINGTON, D. C.

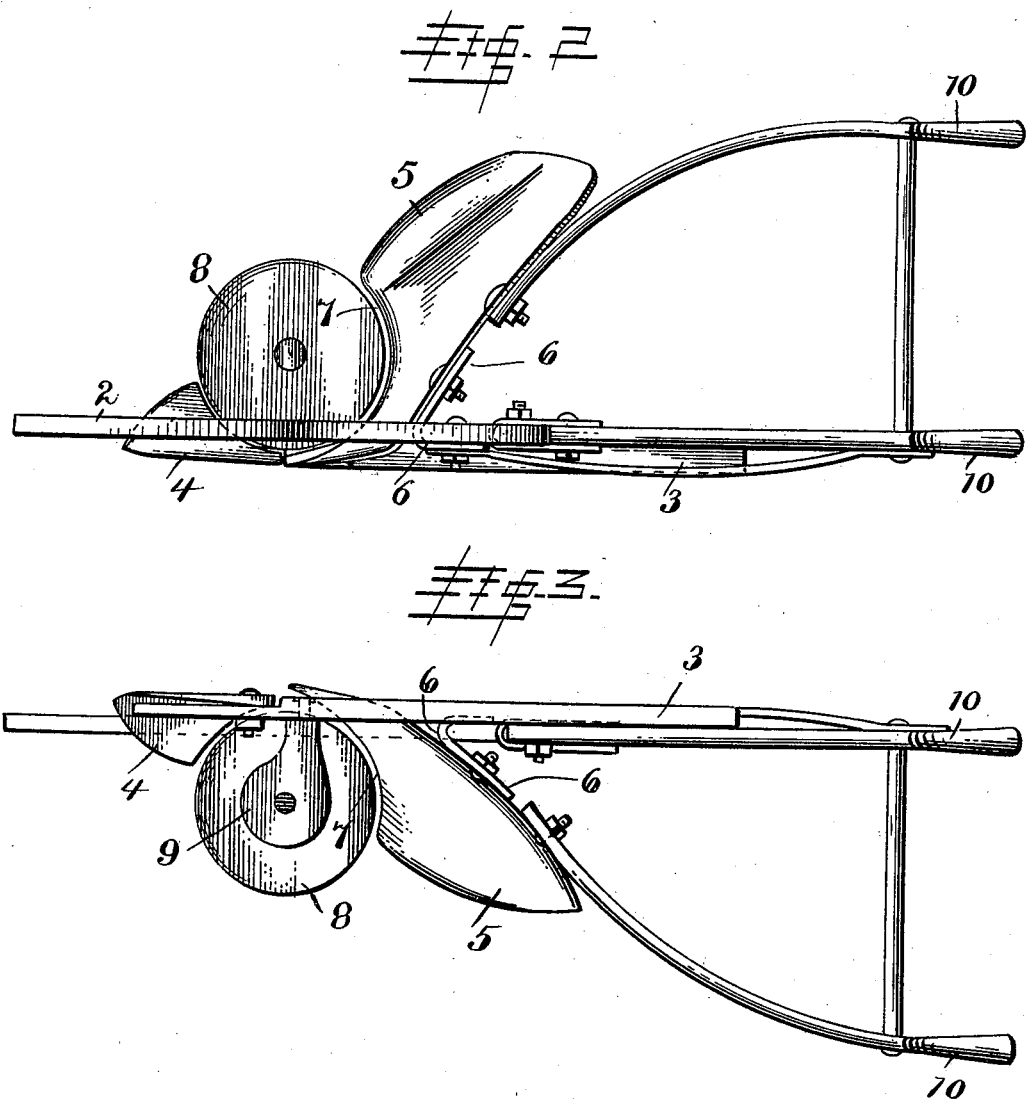

United States Patent Office.

ROBERT H. WIGGINS, OF BUTTE, MONTANA.

PLOW.

SPECIFICATION forming part of Letters Patent No. 599,210, dated February 15, 1898.

Application filed May 20, 1897. Serial No. 637,428. (No model.)

*To all whom it may concern:*

Be it known that I, ROBERT H. WIGGINS, a citizen of the United States, residing at Butte, in the county of Silver Bow and State of Montana, have invented certain new and useful Improvements in Plows; and I do declare the following to be a full, clear, and exact description of the invention, such as will enable others skilled in the art to which it appertains to make and use the same.

My invention relates to plows; and the object is to provide a plow with a rotary share, by means of which the plow may be more easily drawn through the ground and perform its work.

With this object in view the invention consists of certain features of construction and combination of parts, as will be hereinafter more fully described and claimed.

In the accompanying drawings, Figure 1 is a perspective view of my improved plow. Fig. 2 is a top plan view, and Fig. 3 a bottom plan view.

In the drawings, 1 denotes the stock, formed with integral standard 2, to which is secured the landside 3, provided at its forward end with a removable point 4.

5 denotes the moldboard, to the forward side of which is bolted one portion of an angular plate 6, the other portion extending around the front end of the standard and bolted to the side thereof. The forward edge of the moldboard is provided with semicircular recesses 7, and the rear edge of the point as well as a portion of the side of the front end of the landside are also formed with curved recesses to form a seat for the rotary disk share 8, which is journaled upon a bracket 9, riveted or otherwise secured to the front end of the landside and projecting laterally therefrom.

10 denotes the handles, one of which is bolted to the moldboard and the other of which to a clip around the standard and provided with parallel ends, between which the handle is placed and to which it is bolted.

The operation of the device is as follows:

As the plow is drawn along, the rotary share, having its axis to one side of the line of the draft, will more easily cut the soil than if it were simply dragged through the same.

From the foregoing description, taken in connection with the accompanying drawings, the construction and operation of the invention will be readily understood without requiring further explanation.

The plow is exceedingly simple, strong, and durable and may be manufactured at a small cost.

Although I have specifically described the construction and relative arrangement of the several elements of my invention, I do not desire to be confined to the same, as such changes or modifications may be made as clearly fall within the scope of my invention without departing from the spirit thereof.

Having thus described my invention, what I claim as new and useful, and desire to secure by Letters Patent of the United States, is—

A plow comprising a landside, provided with a removable point, the plow-stock having integral standards bolted to the landside, a moldboard, an angular plate connecting said moldboard to the standards; said moldboard, point and landside being provided with curved recesses, a bracket secured to the landside projecting laterally therefrom; the rotary share journaled upon the bracket, and a portion of its periphery engaging the curved recesses of the landside, point, and moldboard; handles, one of which is connected to the moldboard and the other of which is provided with a clip thus connecting it to the standards, and a brace connecting the standards to said handles, substantially as set forth.

In testimony whereof I hereunto affix my signature in presence of two witnesses.

ROBERT H. WIGGINS.

Witnesses:
 Mrs. ROBERT H. WIGGINS,
 M. MUELLER.